United States Patent [19]

Egli

[11] 3,941,104

[45] Mar. 2, 1976

[54] MULTIPLE TURBOCHARGER APPARATUS AND SYSTEM

[75] Inventor: Hans Egli, Santa Monica, Calif.

[73] Assignee: The Garrett Corporation, Los Angeles, Calif.

[22] Filed: July 1, 1974

[21] Appl. No.: 484,891

[52] U.S. Cl. .......... 123/119 CB; 123/119 C; 60/600
[51] Int. Cl.² .................... F02B 33/36; F02B 29/04
[58] Field of Search... 123/119 C, 119 CB, 119 CA; 60/600, 602, 612

[56] References Cited
UNITED STATES PATENTS

| | | | |
|---|---|---|---|
| 2,444,644 | 7/1948 | Fullemann | 60/612 X |
| 3,149,820 | 9/1964 | Maio | 415/13 |
| 3,150,650 | 9/1964 | Dreesen et al. | 123/119 C |
| 3,250,068 | 5/1966 | Vulliamy | 123/119 C X |
| 3,292,364 | 12/1966 | Cazier | 417/380 |
| 3,313,518 | 4/1967 | Nancarrow | 415/3 |
| 3,423,926 | 1/1969 | Nancarrow et al. | 60/202 X |
| 3,557,549 | 1/1971 | Webster | 60/602 |
| 3,796,047 | 3/1974 | Crook et al. | 60/612 |

FOREIGN PATENTS OR APPLICATIONS

| | | | |
|---|---|---|---|
| 605,533 | 7/1948 | United Kingdom | 123/119 CB |

Primary Examiner—Charles J. Myhre
Assistant Examiner—William C. Anderson
Attorney, Agent, or Firm—Orville R. Seidner; Albert J. Miller; Jack D. Puffer

[57] ABSTRACT

A multiple turbosupercharger system for an internal combustion engine routes the air from ambient, or combustible gas mixture from downstream of the carburetor, serially through a low-pressure compressor, a high-pressure compressor, the engine's intake and exhaust manifolds, and thence through the high-pressure and low-pressure turbines, thereafter exhausting to ambient. The high-pressure turbine, being of the meridionally divided wall type, is coupled to the engine's exhaust manifold so as to efficiently utilize the blowdown pulse energy of the exhaust gas. The low-pressure turbine has a movable vane in its gas distributor for establishing exhaust gas flow rate control without substantial loss of total energy of the fluid. The vane is positioned by an actuator under the control of sensing means which senses a suitable system or engine parameters.

12 Claims, 1 Drawing Figure

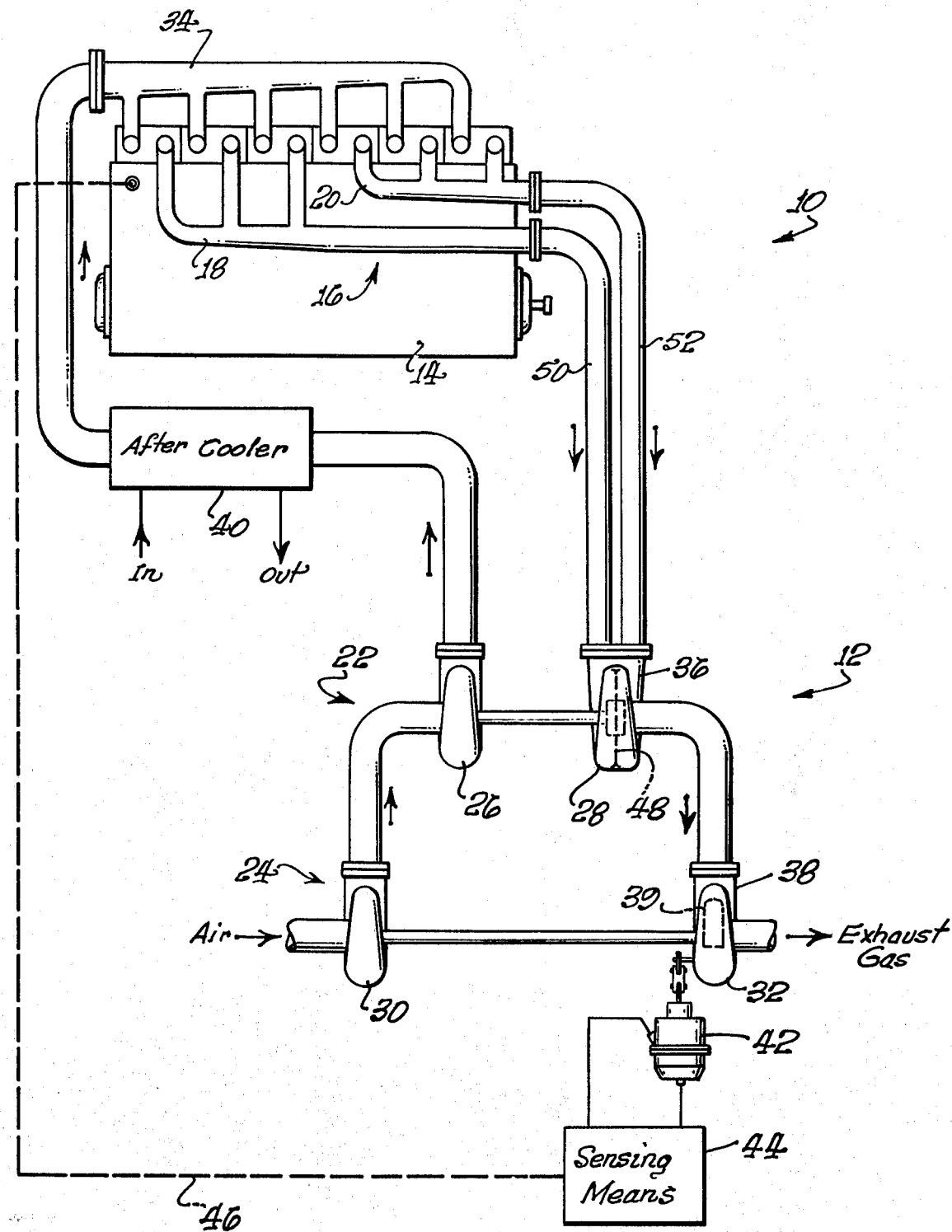

MULTIPLE TURBOCHARGER APPARATUS AND SYSTEM

BACKGROUND OF THE INVENTION

In the field of supercharging internal combustion engines by means of turbochargers, in which the fluid admitted to the intake of an engine is compressed by a compressor driven by a turbine which extracts driving energy from the exhaust gas of the engine, there has arisen the need for multiple turbocharging systems for use with engines whose output speed varies over a working range from full rated speed down to a much lower speed which may be, for example, 50% rated speed or below. These systems require, for example, two series coupled turbochargers usually designated as low-pressure and high-pressure turbochargers. In such an arrangement, the compressor of the low-pressure turbocharger discharges into the intake of the compressor of the high-pressure turbocharger, and the exhaust gas discharge of the turbine of the high-pressure turbocharger is conducted to the inlet of the turbine of the low-pressure turbocharger.

It is obvious, of course, that the gaseous fluid flow rate increases as engine speed increases. Hence the availability of exhaust gas to drive the turbines varies with engine speed. It is desirable, however, to maintain a substantially constant level of charge pressure in the intake manifold of the engine.

In the case where there are no controls, it is known that as the through-flow of exhaust gas drops off with a decrease of engine speed and/or load, the high-pressure turbine dominates the energy extraction and thus the low-pressure turbine produces little power.

In order to increase the power output of turbines in series, it has been customary in the prior art to resort to somewhat sophisticated and expensive turbine structures, usually including complex nozzles with a plurality of variable vanes in the gas distributor and/or resorting to wasteful valve arrangements for throttling or dumping the exhaust gas flow at one or more locations in the exhaust gas flow path.

SUMMARY OF THE INVENTION

It has been discovered that the operation of a system of multiple turbochargers for an internal combustion engine operated over a range of speed is considerably enhanced and the structural requirements simplified by providing the turbine of one of the turbochargers (preferably the low-pressure turbocharger) with a gas distributor of the single-passage type, within which passage is mounted a single movable vane arranged to control the exhaust gas flow to the turbine rotor. With the aforesaid movable vane structure in the gas distributor of the low-pressure turbine, it is desirable that the turbine of the high pressure turbocharger, which is coupled immediately and directly to the engine exhaust manifold system, be of the type which will extract maximum blow-down pulse energy from the pulsating exhaust gas flow from the engine. To this end, it is desirable that the pulse turbine be of a type having a gas distributor with two or more passages coupled with separate exhaust manifold branches of appropriate cylinder groups. Preferably, the exhaust gas distributor of the turbine is of the meridionally divided wall type which admits the pulsating gas from each manifold branch substantially around the whole circumference of the turbine rotor, whereby a maximum amount of blow-down energy is extracted from the exhaust gas pulsations.

Thus, as summarized above, the invention comprises a simplified structural design approach for the series operation of turbines which are supplied with pulsating exhaust gas from a multi-cylinder internal combustion engine.

BRIEF DESCRIPTION OF THE DRAWING

The single FIGURE of the drawing illustrates in schematic form the application of the invention to an internal combustion engine.

DESCRIPTION OF THE PREFERRED EMBODIMENT

Referring to the drawing, the complete turbocharging and engine system 10 comprises the turbocharging sub-system 12 co-operatively disposed with respect to the reciprocating internal combustion engine 14 for supercharging the same by extraction of energy from the engine's exhaust gas, which is discharged from the engine's cylinders (not shown) into the exhaust manifold arrangement 16 which may comprise, as shown, a pair of exhaust manifolds 18 and 20.

The turbocharger system 12 comprises a high-pressure turbocharger 22 and a low-pressure turbocharger 24. The high-pressure turbocharger 22 includes a high-pressure compressor 26 driven by the high-pressure turbine 28, while the low-pressure turbocharger 24 includes a low-pressure compressor 30 driven by the low-pressure turbine 32. It should be borne in mind that the terms "high pressure" and "low pressure," as used herein, are merely terms of relativity to atmospheric pressure of the gaseous fluids passing through the respective compressor and turbine structures. Thus, as shown, the low-pressure compressor 30 has its air intake from atmosphere and its discharge coupled to the intake of the high-pressure compressor 26 whose discharge communicates with the intake manifold 34 of the engine 14. As noted, the exhaust gas of the engine 14 is discharged into the exhaust manifold arrangement 16 which communicates with the gas distributor housing 36 of the turbine 28 whose discharge is coupled to the gas distributor housing 38 of the turbine 32, which thereafter discharges to atmosphere. If desired a heat exchanger 40 of the so-called aftercooler type may be disposed between the high-pressure discharge of the compressor 26 and the intake manifold 34 so as to cool the charge air in heat exchange with any convenient source of coolant fluid, all as well-known in the prior art. It is obvious, of course, that a heat exchanger may be disposed between the compressor stages in lieu of the heat exchanger 40 or in addition thereto.

As thus far disclosed, it is apparent that a general system of multiple turbocharging for an engine of the fuel-injection type, e.g., a diesel engine, has been described. It is also apparent to those skilled in the art that whereas the turbocharging system has been illustrated and described in connection with a diesel type engine with supercharging of the atmospheric air, the same system could be employed with a carburetted or injection type engine having a fuel-to-air mixture produced upstream of the intake ports of the engine. The system of the present invention differs from the prior art systems, as generally described hereinabove, in the following particulars.

As is well-known, and as noted hereinabove, in systems of the prior art the low pressure turbine produces little power when engine speed and/or load is reduced. To the end of resolving this deficiency, the present invention utilizes a low-pressure turbine 32 in which the gas distributor 38 thereof is provided with a simple flow control for the exhaust gas which is arranged to control the fluid through-flow in the turbine with very little or no loss of total energy over the operating range of the turbine. More specifically the gas distributor 38 is preferably of the single passage or vaneless scroll type, and is provided with a movable vane means designated by the dashed line 39 which defines with the scroll a variable flow cross-sectional area for the gas at the upstream end of the vane means, at the downstream end, or at both ends of the vane means. Essentially, the cross-sectional areas control the flow and establish the angular momentum. Increasing the area or areas results in an increase of flow without increasing the angular momentum of the gas, and vice versa.

A flow control of the foregoing type is known in the art, one such type being disclosed in U.S. Pat. No. 3,313,518, issued Apr. 11, 1967, in the name of James H. Nancarrow for TURBINE CONTROL, showing a movable vane which exercises flow control of the fluid entering the turbine rotor, substantially as discussed hereinabove.

The flow control of the present invention may be actuated by any one of a number of means, one of which is disclosed as an actuator 42 under the control of a sensing means 44. The actuator 42 may be caused to perform its control function on the flow control vane (not shown) by pneumatic, hydraulic, electrical, or any other preferred means as will be well understood by those skilled in the art.

As stated, the sensing means 44 controls the actuator 42 and the sensing means 44 may sense any one or combination of system or engine parameters as desired, in order to effect operation of the actuator 42 on the flow control vane in the desired manner. For example, the sensing means 44 may exercise control in accordance with the density of the charge fluid at any point in the intake flow path system, the pressure ratio or pressure differential of the gaseous intake fluid across either or both of the compressors 26 and 30; or the sensing means may sense engine throttle position as by a follower against a cam, for example. The particular sensing means forms no part of the present invention, hence the representation of the coupling of the sensing means to extract the signal of the desired engine or system parameter is highly schematic in form and designated by the dashed line 46 only for convenience of reference. As will be understood, the line 46 also represents broadly means to provide the actuator 42 with the necessary pneumatic, hydraulic or electrical power from the overall system 10, or any of its component parts, according to well-known practice in the art.

It has been mentioned briefly that the exhaust manifold arrangement 16 feeding the turbine 28 is split into two separate parts 18 and 20 with one-half the engine cylinders exhausting into the manifold 18 and the other half of the cylinders into the manifold 20. In the case of a six-cylinder engine such as that shown, it is customary to time the firing of the cylinders in the order 1-5-3-6-2-4, for example, and it will be seen from the firing order that the pulsations of exhaust gas will alternate in the manifolds 18 and 20.

By this means the blow-down energy of the exhaust gas pulsations is available to be utilized most effectively in a partial-admission turbine of the type in which the gas distributor of the turbine defines two separate passageways coupled to the separate pulsation sources and communicating the exhaust gas pulsations directly and separately to the turbine rotor for maximum efficiency. The turbine for the purpose may be one of two known types. It may be of the sector admission type such as the turbine structure shown and described in U.S. Pat. No. 2,635,849.

Preferably, however, the turbine structure for most efficient utilization of the blow-down exhaust gas pulsations will be of the type in which the gas distributor is provided with a meridional dividing wall such as that disclosed in U.S. Pat. No. 3,292,364, issued Dec. 20, 1966, in the name of John M. Cazier for GAS TURBINE WITH PULSATING GAS FLOWS.

In the case presented, the meridional dividing wall is designated by the dashed line 48, illustrating schematically a wall in the gas distributor 36 and defining therewith a pair of separate passageways whose inlets, or upstream ends, communicate separately with the manifolds 18 and 20 by means of the conduits 50 and 52. As described in the aforementioned U.S. Pat. No. 3,292,364 the meridional wall 48 defines with the gas distributor 36 a pair of side-by-side single-passage or vaneless passageways, each of which communicates with the rotor of the turbine 28 substantially throughout the full circumference of the turbine's rotor. By this means, the alternating exhaust gas pulsations from the manifolds 18 and 20 are communicated directly to the turbine's rotor.

By utilizing the most efficient turbine for the high-pressure turbocharger 22, there is assured a larger percentage of remanent exhaust gas energy for utilization by the turbine of the low-pressure turbocharger 24 which is particularly beneficial when the through-flow of exhaust gas decreases with lowered engine speed and/or load. By providing the gas distributor of the turbine 32 of the low-pressure turbocharger 24 with a flow control vane as described hereinabove, the remanent energy is extracted from the exhaust gas with the greatest possible efficiency and the speed of the low-pressure turbocharger is maintained at its highest possible level consistent with the demand on the compressor.

While specific embodiments of the invention have been illustrated and described, it is to be understood that these embodiments are provided by way of example only and that the invention is not to be construed as being limited thereto, but only by the proper scope of the following claims.

What I claim is:
1. Turbocharger apparatus comprising:
   a. first and second turbochargers having respective first and second turbines drivingly coupled to respective first and second compressors,
   said first and second turbines having respective first and second fluid distributors arranged to admit fluid to respective first and second rotors of said turbines,
   said first distributor being characterized as a vaneless scroll housing enclosing said first rotor of said first turbine and having meridional wall means disposed therein extending from adjacent the entrance of said housing to substantially adjacent said first rotor, said second distributor being characterized as a vaneless scroll housing enclosing said second rotor of said second turbine, said second turbine including vane means adjustably disposed adjacent the fluid entrance of said vaneless scroll housing of said second fluid distributor and arranged to vary the fluid flow therein without substantial loss of total energy of the fluid over a predetermined operating range of said second turbine;

b. fluid conduit means coupling the exhaust of said first turbines to the inlet of said second turbine and the discharge of one of said compressors to the intake of the other of said compressors and c. an internal combustion engine having intake and exhaust manifold means, with the discharge of said first compressor coupled to said intake manifold means, said exhaust manifold means providing a coupling between one group of engine cylinders and one portion of said distributor defined by one surface of said meridional wall means, and providing a coupling between another group of engine cylinders and another portion of said first distributor defined by another surface of said meridional wall means.

2. In combination:

a multi-cylinder internal combustion engine to receive a compressed charge fluid and produce useful power and heated exhaust gases;

a high pressure turbocharger having a high pressure turbine to receive and be driven by the heated exhaust gases from said internal combustion engine and a high pressure compressor on a common shaft with said high pressure turbine to compress a charge fluid and deliver the compressed charge fluid to said internal combustion engine;

said high pressure turbine including a housing disposed around a turbine rotor, said housing having a meridional wall extending substantially to said turbine rotor to define two separate exhaust gas passageways in said turbine housing to said turbine rotor;

means to deliver the exhaust gases of some of said internal combustion engine cylinders to one of said turbine housing passageways and means to deliver the exhaust gases of the other of said internal combustion engine cylinders to the other of said turbine housing passageways;

a low pressure turbocharger having a low pressure turbine to receive and be driven by the exhaust gases from said high pressure turbine and a low pressure compressor on a common shaft with said low pressure turbine to compress charge fluid and deliver the compressed charge fluid to said high pressure compressor;

said low pressure turbine including a turbine rotor, a housing disposed around said turbine rotor, and adjustable vane means disposed in said housing to vary the fluid flow therein without substantial loss of total energy of the fluid; and means to adjust said adjustable vane means in said turbine housing, said vane adjusting means responsive to at least one parameter of this combination.

3. Turbomachinery apparatus comprising:

a. first and second elastic fluid turbines having respective first and second fluid distributors arranged to admit fluid to respective first and second rotors of said turbines;

said second distributor being characterized as a vaneless scroll housing enclosing said second rotor of said second turbine;

b. fluid flow control means in said second distributor comprising vane means adjustably disposed adjacent the fluid entrance to said vaneless scroll housing and arranged to vary the fluid flow therein without substantial loss of total energy of the fluid over a predetermined operating range of said second turbine; and c. fluid conduit means coupling the exhaust of one of said turbines to the inlet of the other of said turbines.

4. The apparatus of claim 1 in which said fluid conduit means couples the exhaust of said first turbine to the inlet of said second turbine.

5. The apparatus of claim 1 in which said first fluid distributor is characterized as a vaneless scroll housing enclosing said first rotor of said first turbine.

6. Turbomachinery apparatus comprising:

a. first and second elastic fluid turbines having respective first and second fluid distributors arranged to admit fluid to respective first and second rotors of said turbines, said distributors being characterized as vaneless scroll housings enclosing said turbine rotors, the housing of said first rotor of said first turbine having meridional wall means disposed therein extending from adjacent the entrance of said housing to substantially adjacent said first rotor;

b. vane means adjustably disposed adjacent the fluid entrance to one of said vaneless scroll housings and arranged to vary the fluid flow therein without substantial loss of total energy of the fluid over a predetermined operating range of the turbine of which said one of said vaneless scroll housings is comprised; and c. fluid conduit means coupling the exhaust of said first turbine to the inlet of said second turbine.

7. The apparatus of claim 4 in which said vane means is adjustably disposed in the vaneless scroll housing of said second turbine.

8. Turbocharger apparatus comprising:

a. first and second turbochargers having respective first and second turbines drivingly coupled to respective first and second compressors, said first and second turbines having respective first and second fluid distributors arranged to admit fluid to respective first and second rotors of said turbines, said second distributor being characterized as a vaneless scroll housing enclosing said second rotor of said second turbine;

b. fluid flow control means in said second distributor comprising vane means adjustably disposed adjacent the fluid entrance to said vaneless scroll housing and arranged to vary the fluid flow therein without substantial loss of total energy of the fluid over a predetermined operating range of said second turbine; and c. fluid conduit means coupling the discharge of one of said compressor to the intake of the other of said compressors and the exhaust of one of said turbines to the inlet of the other of said turbines.

9. The apparatus of claim 8 in which the exhaust of said first turbine is coupled to the inlet of said second turbine.

10. The apparatus of claim 9 in which the intake of said first compressor is coupled to the discharge of said second compressor.

11. The apparatus of claim 10 arranged for coupling with an internal combustion engine with the discharge of said first compressor supplying combustion supporting fluid to intake manifold means of said engine, and exhaust manifold means of said engine exhausting combustion products to the inlet of said first turbine.

12. The apparatus of claim 11 in which said first fluid distributor includes meridional wall means to define two throughflow spaces in said distributor and wherein appropriate groups of cylinders of said engine are adapted to be coupled to communicate exhaust combustion products to said spaces so as to utilize the blowdown energy of the exhaust combustion products.

* * * * *